Patented July 13, 1926.

1,592,777

UNITED STATES PATENT OFFICE.

KARL JOHAN MONRAD, OF LITTLE FALLS, NEW YORK, ASSIGNOR TO CHR. HANSEN'S LABORATORY, INC., OF LITTLE FALLS, NEW YORK, A CORPORATION OF NEW YORK.

LIQUID COMPOSITION FOR PRODUCING LACTIC FOOD.

No Drawing.      Application filed January 9, 1923. Serial No. 611,639.

This invention relates to a composition of matter to be added to milk or cream for the purpose of producing a food product. The object of the present invention is to produce a liquid or syrupy agent which may be mixed with raw or Pasteurized milk or cream and form therefrom a pudding, dessert, or ice cream, with no other preparation than a slight warming of the milk and the stirring of the milk for a very brief period of time as the liquid is added.

For many years it has been well known that rennet either in dry or liquid form may be mixed with milk to coagulate it so that the resulting food product may after sweetening and flavoring be eaten with a spoon. The present invention does not relate in any way to the use of rennet alone but is directed solely to the improvement which consists in providing a liquid composition which not only curdles milk under proper conditions, but which contains all the necessary ingredients except milk for the making of a junket or pudding, is easy to dissolve, and which gives a clear product.

The preparation is prepared without drying and consequently I avoid all loss of flavoring in drying or in storage as well as avoid the scum sometimes present after making pudding with a dry powder, this scum being particularly noticeable in the chocolate and cocoa flavors.

The quantities or proportions of the various ingredients in the composition forming the subject matter of the present invention may naturally be varied to a considerable degree with respect to flavoring and sugar so as to suit various different tastes and circumstances.

In its most complete form the composition includes in addition to the curdling agent, sugar and a flavoring ingredient, such other important but not absolutely essential ingredients as a gelatinous or gummy substance to hold the flavoring in suspension or alcohol to effect its solution and a calcium salt, preferably the hypophosphite to insure more rapid action of the curdling agent, preferably rennet, and coloring matter having no other function than to please the eye.

The sugar is preferably granulated cane sugar, and is used in the form of a syrup not only to sweeten the pudding, but to dilute the curdling agent to such an extent as to avoid all danger of unevenly coagulating the milk when the liquid is added to the milk. The flavoring ingredient may be either volatile such as the usual vanilla, raspberry, lemon, and orange flavoring extracts, or may be of more stable compounds, such for example, as chocolate, coffee, or caramel flavors.

The gelatinous or gummy substance is for the purpose of holding the volatile oil of the flavoring ingredients in suspension. The purpose of the alcohol is to aid the solution of the volatile oil of the flavoring ingredients which if they were simply mixed with the finely ground sugar might evaporate on continued storage to such an extent as to cause the mixture to lose an appreciable amount of its flavor. The gum obviously is omitted when such non-volatile flavors as chocolate or cocoa are used.

The soluble calcium salt such as hypophosphite calcium is used to lessen the time required for the rennet to curdle the milk and it is especially important to include this element in case fresh raw milk is used, this food requiring a considerable time to curdle if the rennet were used alone. In addition the calcium salt, as is well known in the art, restores to Pasteurized milk the property of being curdled quickly by the rennet.

The coloring matter is quite optional and is added for the sole purpose of producing a tint pleasing to the eye in the finished pudding when the mixture is added to the milk, for example, a yellow-red dye for the orange, a pink tint for raspberry, which colorings the public has long been taught to expect of these flavors, although never actually existing in uncolored absolutely pure products.

Merely as illustrative of the method of making the liquid composition the usual practice of making an orange flavored compound is as follows: 120 grams of calcium hypophosphite are dissolved in 33 pounds of water if necessary by heating. 65 pounds of sugar are added to this solution when hot, so as to get complete solution. 45 grams of gum are thoroughly mixed with 163 grams of water and emulsified with 28 cubic centimeters of terpeneless oil of orange, previously dissolved in 30 cubic centimeters of alcohol. The gum mixture is then mixed with the sugar syrup containing the calcium hypophosphite very gradually with constant stirring, so as to produce a homogeneous mixture, or if preferred, the gum may be dissolved by boiling in the water, the calcium hypophosphite solution or in the syrup. By this method, the gum is more soluble and gives a clearer solution. The oil of orange would then be added afterwards either direct or in an alcoholic solution. 27 grams of rennet powder are added and if desired, coloring material to give the dessert, pudding or ice cream material a pleasing shade.

While I have given the above process in full, it should particularly be borne in mind that it is merely a typical example, and it is absolutely immaterial as far as the present invention is concerned what particular flavoring is used, the invention residing particularly in the use of a liquid mixture containing rennet or the coagulating agent which will coagulate milk and produce a clear pure lactic food without further addition of anything. The composition prepared as above or similarly with variations depending upon circumstances is sold in containers of any preferred type and is used by adding the liquid directly to lukewarm milk in the proportion for example of about 135 grams to a quart of milk or cream. At the time of mixing the liquid or syrupy compound and milk the milk should be stirred quite vigorously for a period of say half a minute in order to thoroughly incorporate the liquid agent into the milk which is then allowed to rest until it becomes curdled or thickened into a pudding or into material suitable for freezing into an ice cream mixture. The word "liquid" in the claims is to be construed as covering a syrupy mixture as would necessarily be produced by mixing the ingredients in the proportions named.

What is claimed is:

1. A liquid composition for producing with raw or Pasteurized milk a pudding, containing sugar, water, calcium hypophosphite, and rennet in the approximate proportion by weight of 65 pounds of sugar, 33 pounds of water, 120 grams of calcium hypophosphite, and 27 grams of rennet.

2. A liquid composition containing all the necessary ingredients except milk for the making of puddings, consisting of sugar, water, calcium hypophosphite, and rennet in the approximate proportion by weight of 65 pounds of sugar, 33 pounds of water, 120 grams of calcium hypophosphite, and 27 grams of rennet; and containing in addition a volatile flavoring ingredient and a gum to hold the flavoring agent in suspension.

KARL JOHAN MONRAD.